US010902719B2

(12) United States Patent
     Baik (10) Patent No.: US 10,902,719 B2
(45) Date of Patent: Jan. 26, 2021

(54) METHOD OF PREDICTING TRAFFIC CONGESTION AND CONTROLLING TRAFFIC SIGNALS BASED ON DEEP LEARNING AND SERVER FOR PERFORMING THE SAME

(71) Applicant: BLUESIGNAL CORPORATION, Daejeon (KR)

(72) Inventor: Seng Tae Baik, Daejeon (KR)

(73) Assignee: BLUESIGNAL CORPORATION, Daejeon (KR)

( * ) Notice: Subject to any disclaimer, the term of this patent is extended or adjusted under 35 U.S.C. 154(b) by 318 days.

(21) Appl. No.: 16/186,899

(22) Filed: Nov. 12, 2018

(65) Prior Publication Data

US 2020/0135018 A1    Apr. 30, 2020

(30) Foreign Application Priority Data

Oct. 24, 2018   (KR) .......................... 10-2018-0127199

(51) Int. Cl.
     *G08G 1/08*         (2006.01)
     *G06K 9/00*         (2006.01)
     (Continued)

(52) U.S. Cl.
     CPC ........... *G08G 1/08* (2013.01); *G06K 9/00785* (2013.01); *G06K 9/6262* (2013.01); *G06N 5/02* (2013.01);
     (Continued)

(58) Field of Classification Search
     None
     See application file for complete search history.

(56) References Cited

U.S. PATENT DOCUMENTS

| 8,050,854 B1* | 11/2011 | Chandra | ................ G08G 1/081 |
| | | | 701/117 |
| 2014/0210645 A1* | 7/2014 | Sharma | .................... G08G 1/07 |
| | | | 340/907 |
| 2018/0158326 A1* | 6/2018 | Fowe | ................... G08G 1/0133 |

FOREIGN PATENT DOCUMENTS

| JP | 2005-071292 A | 3/2005 |
| JP | 2008-059615 A | 3/2008 |

(Continued)

*Primary Examiner* — Jonathan M Dager
*Assistant Examiner* — Garrett F Evans
(74) *Attorney, Agent, or Firm* — KORUS Patent, LLC; Seong Il Jeong (57) ABSTRACT

A method of predicting traffic congestion and controlling traffic signals based on deep learning according to an embodiment of the present invention includes: analyzing regional network outflow behavior based on a per-intersection traffic demand pattern or traffic signal control, and determining a specific intersection to be a control target intersection based on the results of the analysis; generating 2D space-time images by analyzing the data of predetermined customized composite data corresponding to the control target intersection and a plurality of pieces of image data for the control target intersection in terms of time and space; generating a real-time traffic congestion index by using the 2D space-time image of the control target intersection and the 2D space-time image of the data of the customized composite data corresponding to the control target intersection; and controlling the traffic signals of the control target intersection based on the real-time traffic congestion index.

8 Claims, 3 Drawing Sheets

(51) Int. Cl.
*G06K 9/62* (2006.01)
*G06N 5/02* (2006.01)
*G08G 1/01* (2006.01)
*G08G 1/081* (2006.01)

(52) U.S. Cl.
CPC ......... *G08G 1/0133* (2013.01); *G08G 1/0145* (2013.01); *G08G 1/081* (2013.01)

(56) References Cited

FOREIGN PATENT DOCUMENTS

| KR | 10-2011-0026221 A | 3/2011 |
| KR | 10-2015-0072471 A | 6/2015 |
| KR | 10-1696881 B1 | 1/2017 |

* cited by examiner

METHOD OF PREDICTING TRAFFIC CONGESTION AND CONTROLLING TRAFFIC SIGNALS BASED ON DEEP LEARNING AND SERVER FOR PERFORMING THE SAME

CROSS-REFERENCE TO RELATED APPLICATION

This application claims the benefit of Korean Patent Application No. 10-2018-0127199 filed on Oct. 24, 2019, which is hereby incorporated by reference herein in its entirety.

BACKGROUND

1. Technical Field

Embodiments of the present invention relate to a method for predicting traffic congestion and controlling traffic signals based on deep learning and a server for performing the same.

2. Description of the Related Art

A traffic signal control system is an important system that improves safety and traffic efficiency by controlling the priorities of movement of conflicting aggregated traffic flows at an intersection. However, the false determination of a current situation and the improper operation of traffic signals increase congestion by deteriorating traffic efficiency, and cause dangers by inducing the dangerous driving patterns of drivers.

Currently, such traffic signal control systems have been constructed in 21 municipalities including metropolitan cities, including Seoul, and small cities in Korea. However, most intersections are operated by a time of day (TOD) control method, rather than an actuated control method, due to the limited management and operation of loop detectors, which are traffic information collection systems.

A fixed-time control method plans signal times based on the approximate traffic volume of an intersection. The TOD control method calculates signal times based on the traffic volume determined through the full investigation of the traffic volume during commuting hours during which the traffic volume changes rapidly and the traffic volume during the daytime and early morning hours during which the traffic volume is constant.

In terms of maintenance and repair, the fixed-time control method or TOD control method is advantageous for an intersection where a traffic pattern is kept constant. However, a traffic pattern changes due to an environmental factor, such as a change in a method of operating roads in a city. Accordingly, previously planned signal times are not suitable for the changed traffic pattern, and are inefficiently managed. Meanwhile, it is not possible to monitor traffic volume or investigate it every time at an intersection in order to solve the above-described problem.

SUMMARY

An object of the present invention is to provide a method of predicting traffic congestion and controlling traffic signals based on deep learning and a server for performing the same, which are capable of solving a traffic congestion cost problem by applying artificial intelligence traffic signal control technology at predicted congestion time in order to control the traffic signals of a congested intersection.

Another object of the present invention is to provide a method of predicting traffic congestion and controlling traffic signals based on deep learning and a server for performing the same, which are capable of monitoring per-intersection traffic information collected in real time, and which are also capable of more objectively and systematically performing urban traffic operation and management.

Another object of the present invention is to provide a method of predicting traffic congestion and controlling traffic signals based on deep learning and a server for performing the same, which are capable of reducing urban congestion by operating the traffic signals of an intersection in response to the demands that vary depending on an environment.

Another object of the present invention is to provide a method of predicting traffic congestion and controlling traffic signals based on deep learning and a server for performing the same, which are capable of providing social benefits by reducing travelling expenses, logistical costs, etc. by means of reductions in traffic congestion, which are capable of performing the control of signal periods in which not only traffic information but also the real-time situation of a current intersection have been incorporated into newly constructed traffic infrastructure, and which are also capable of being applied without incurring the cost required to change existing infrastructure or to add excessive equipment to the infrastructure, thereby improving utility.

Objects of the present invention are not limited to the above-described objects, and other unmentioned objects will be clearly understood from the following description by those having ordinary knowledge in the art to which the present invention pertains.

According to an aspect of the present invention, there is provided a method of predicting traffic congestion and controlling traffic signals based on deep learning, the method being performed in a deep learning-based traffic congestion prediction and traffic signal control server, the method including: analyzing regional network outflow behavior based on a per-intersection traffic demand pattern or traffic signal control, and determining a specific intersection to be a control target intersection based on the results of the analysis; generating second-dimensional (2D) space-time images by analyzing the data of predetermined customized composite data corresponding to the control target intersection and a plurality of pieces of image data for the control target intersection in terms of time and space; generating a real-time traffic congestion index by using the 2D space-time image of the control target intersection and the 2D space-time image of the data of the customized composite data corresponding to the control target intersection; and controlling the traffic signals of the control target intersection based on the real-time traffic congestion index.

According to another aspect of the present invention, there is provided a deep learning-based traffic congestion prediction and traffic signal control server, including: a control target intersection determination unit configured to analyze regional network outflow behavior based on a per-intersection traffic demand pattern or traffic signal control, and to determine a specific intersection to be a control target intersection based on the results of the analysis; a 2D space-time image generation unit configured to generate 2D space-time images by analyzing the data of predetermined customized composite data corresponding to the control target intersection and a plurality of pieces of image data for the control target intersection in terms of time and space; a real-time traffic congestion index generation unit configured to generate a real-time traffic congestion index by using the 2D space-time image of the control target intersection and the 2D space-time image of the data of the customized composite data corresponding to the control target intersection; and a traffic signal control unit configured to control the traffic signals of the control target intersection based on the real-time traffic congestion index.

Details of other embodiments are included in the detailed description and the accompanying drawings.

The advantages and/or features of the present invention and methods for achieving them will be apparent from the embodiments that will be described in conjunction with the accompanying drawings. However, the present invention is not limited to the embodiments described in detail below, but may be implemented in various different forms. The described embodiments are provided merely to make the disclosure of the present invention thorough and complete and to fully convey the scope of the present invention to those having ordinary knowledge in the art to the present invention pertains. The present invention is defined only by the scope of the attached claims. Throughout the overall specification, similar reference symbols designate similar components.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings.

Figure 1:
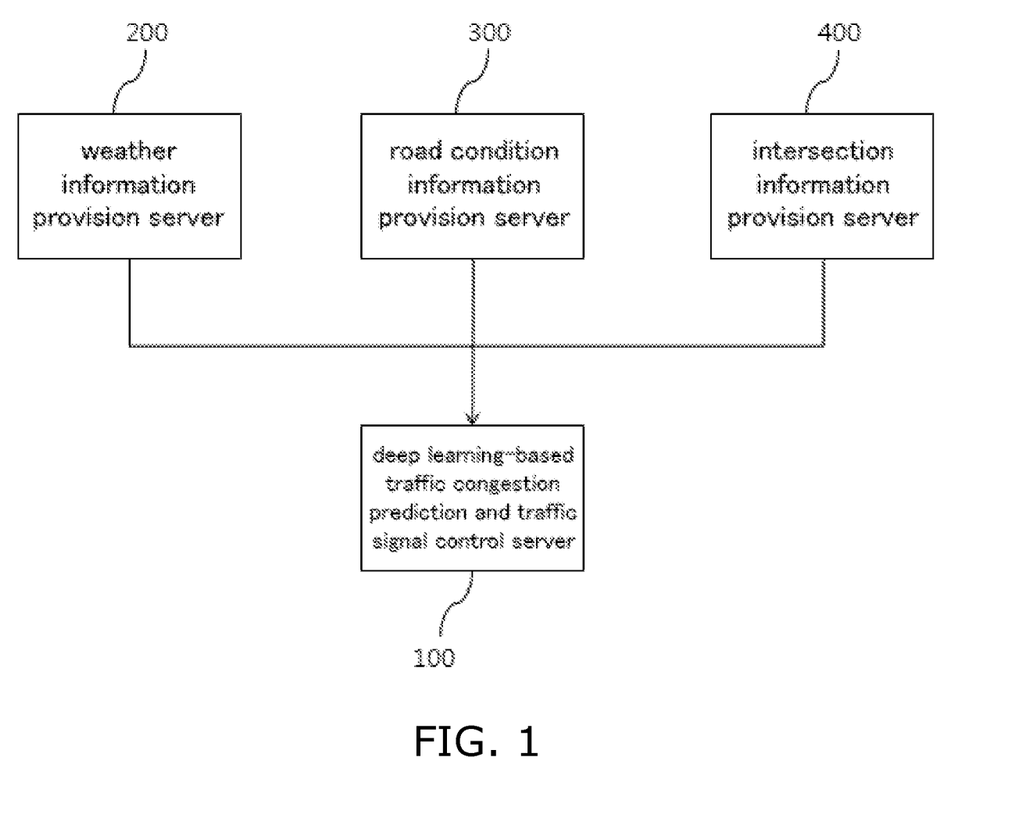
FIG. 1 is a conceptual diagram illustrating a system for predicting traffic congestion and controlling traffic signals based on deep learning according to an embodiment of the present invention.

FIG. 1 is a conceptual diagram illustrating a system for predicting traffic congestion and controlling traffic signals based on deep learning according to an embodiment of the present invention.

Referring to FIG. 1, the system for predicting traffic congestion and controlling traffic signals based on deep learning includes a deep learning-based traffic congestion prediction and traffic signal control server 100, a weather information provision server 200, a road condition information provision server 300, and an intersection information provision server 400.

The deep learning-based traffic congestion prediction and traffic signal control server 100 is a server configured to generate a real-time traffic congestion index for a control target intersection and to control the traffic signals of the control target intersection based on the real-time traffic congestion index.

For this purpose, the deep learning-based traffic congestion prediction and traffic signal control server 100 analyzes the congestion level of each intersection, and determines a specific intersection to be a control target intersection based on the results of the analysis.

In an embodiment, the deep learning-based traffic congestion prediction and traffic signal control server 100 determines a change in regional traffic volume by analyzing regional network outflow behavior based on a traffic demand pattern, and determines a specific intersection to be a control target intersection based on the change in regional traffic volume.

In the above embodiment, the deep learning-based traffic congestion prediction and traffic signal control server 100 determines a change in regional traffic volume by analyzing the traffic demand (outbound demand) directed to areas outside a downtown road network area and the traffic demand (local demand) directed to the inside of the area, such as a residential area road and a parking space.

Furthermore, the deep learning-based traffic congestion prediction and traffic signal control server 100 determines the change in regional traffic volume by analyzing the network outflow change behavior of a corresponding region based on the ratio between per-type traffic demands and the traffic volume.

In another embodiment, the deep learning-based traffic congestion prediction and traffic signal control server 100 determines a change in regional traffic volume by analyzing regional network outflow behavior based on traffic signal control, and determines a specific intersection to be a control target intersection based on the change in regional traffic volume.

Signal periods at an intersection corresponding to the boundary between downtown areas are determined based on boundary capacity, i.e., the maximum number of vehicles that can move between the areas. Accordingly, the control target intersection determination unit 110 analyzes the network outflow behavior that is influenced by a change in boundary capacity based on the control of signal periods at the intersection.

Once the control target intersection has been determined via the above-described process, the deep learning-based traffic congestion prediction and traffic signal control server 100 generates a 2D space-time image of the control target intersection and a 2D space-time image of customized composite data.

First, a process by which the deep learning-based traffic congestion prediction and traffic signal control server 100 generates the 2D space-time image of the control target intersection will be described.

The deep learning-based traffic congestion prediction and traffic signal control server 100 generates the 2D space-time image of the control target intersection by analyzing a plurality of pieces of image data for the control target intersection in terms of time and space.

First, the deep learning-based traffic congestion prediction and traffic signal control server 100 analyzes image data for the control target intersection, represents the image data in the form of 2D space-time matrices, and generates the 2D image by using the 2D space-time matrices.

The deep learning-based traffic congestion prediction and traffic signal control server 100 generates a grid for a 2D space-time domain by dividing a space into a specific number of sections in the plurality of pieces of image data for the control target intersection, and then calculates average travel speeds for the respective sections.

Thereafter, the deep learning-based traffic congestion prediction and traffic signal control server 100 determines a corresponding section to be any one of a plurality of channels based on its average travel speed, and inputs a numerical value corresponding to the determined channel into the grid.

For example, the 2D space-time image generation unit 120 classifies a corresponding section as any one of a red (R) channel, a green (G) channel, and a blue (B) channel based on its average travel speed. Each of the channels is represented by an 8-bit numerical value including 256 colors. In other words, the average travel speed may be represented by a numerical value including 3-channel RGB colors between 0 and 1 in a reverse manner.

Meanwhile, a process by which the deep learning-based traffic congestion prediction and traffic signal control server 100 analyzes the data of the customized composite data corresponding to the control target intersection in terms of time and space and generates the 2D space-time image of the customized composite data will be described.

The customized composite data includes meteorological information, road environment information, time environment information, and unexpected situation information. The meteorological information includes weather information, fine dust information, etc., the road environment information includes traffic situation information, traffic volume information, etc., the unexpected situation information includes traffic accident information, broken-down vehicle information, road control information, etc., and the time environment information includes time information, holiday information, etc.

The deep learning-based traffic congestion prediction and traffic signal control server 100 generates the 2D space-time image of the control target intersection by analyzing a plurality of pieces of image data for the control target intersection in terms of time and space.

First, the deep learning-based traffic congestion prediction and traffic signal control server 100 generates the 2D space-time image by combining the weather information and unexpected situation information of the customized composite data for each piece of time environment information and corresponding space information (e.g., location information) with road environment information. Thereafter, the 2D space-time image generation unit 120 performs labeling based on the road environment information.

Thereafter, the deep learning-based traffic congestion prediction and traffic signal control server 100 generates a real-time traffic congestion index by using the 2D space-time image of the control target intersection and the 2D space-time image of the customized composite data.

Thereafter, the deep learning-based traffic congestion prediction and traffic signal control server 100 controls the traffic signals of the control target intersection based on the real-time traffic congestion index.

The weather information provision server 200 provides meteorological information to the deep learning-based traffic congestion prediction and traffic signal control server 100. The meteorological information includes weather information, fine dust information, etc.

The road condition information provision server 300 provides road condition information to the deep learning-based traffic congestion prediction and traffic signal control server 100. The road condition information includes road environment information and unexpected situation information, the road environment information includes traffic situation information, traffic volume information, etc., and the unexpected situation information includes traffic accident information, broken-down vehicle information, road control information, etc.

The intersection information provision server 400 provides per-intersection identification information to the deep learning-based traffic congestion prediction and traffic signal control server 100. Accordingly, the deep learning-based traffic congestion prediction and traffic signal control server 100 analyzes a per-intersection congestion level by using the per-intersection identification information, and may determine a specific intersection to be a control target intersection based on the results of the analysis.

Figure 2:
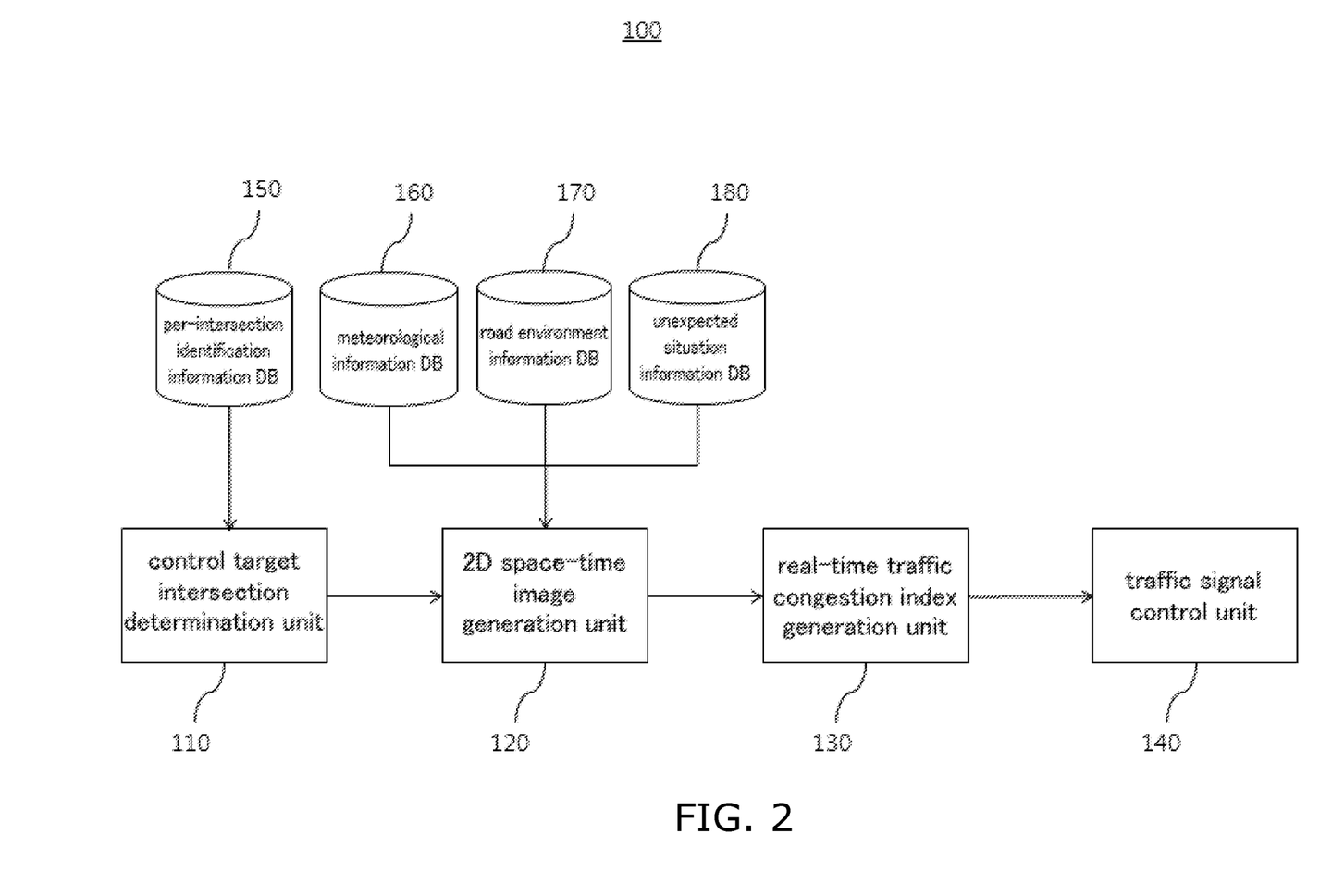
FIG. 2 is a block diagram illustrating the internal structure of a deep learning-based traffic congestion prediction and traffic signal control server according to an embodiment of the present invention.

FIG. 2 is a block diagram illustrating the internal structure of a deep learning-based traffic congestion prediction and traffic signal control server 100 according to an embodiment of the present invention.

Referring to FIG. 2, the deep learning-based traffic congestion prediction and traffic signal control server 100 includes a control target intersection determination unit 110, a 2D space-time image generation unit 120, a real-time traffic congestion index generation unit 130, a traffic signal control unit 140, a per-intersection identification information database (DB) 150, a meteorological information DB 160, a road environment information DB 170, and an unexpected situation information DB 180.

The control target intersection determination unit 110 analyzes a per-intersection congestion level by using the per-intersection identification information DB 150, and determines a specific intersection to be a control target intersection based on the results of the analysis.

In an embodiment, the control target intersection determination unit 110 determines a change in regional traffic volume by analyzing regional network outflow behavior based on a traffic demand pattern.

In the above embodiment, the control target intersection determination unit 110 determines a change in regional traffic volume by analyzing the traffic demand (outbound demand) directed to areas outside a downtown road network area and the traffic demand (local demand) directed to the inside of the area, such as a residential area road and a parking space.

Furthermore, the control target intersection determination unit 110 determines the change in regional traffic volume by analyzing the network outflow change behavior of a corresponding region based on the ratio between per-type traffic demands and the traffic volume.

In another embodiment, the control target intersection determination unit 110 determines the change in regional traffic volume by analyzing regional network outflow behavior based on traffic signal control.

Signal periods at an intersection corresponding to the boundary between downtown areas are determined based on boundary capacity, i.e., the maximum number of vehicles that can move between the areas. Accordingly, the control target intersection determination unit 110 analyzes the network outflow behavior that is influenced by a change in boundary capacity based on the control of signal periods at the intersection.

The 2D space-time image generation unit 120 generates the 2D space-time image of the customized composite data by analyzing the data of the customized composite data corresponding to the control target intersection in terms of time and space by using the meteorological information DB 160, the road environment information DB 170, and the unexpected situation information DB 180. In this case, the customized composite data includes meteorological information stored in the meteorological information DB 160, road environment information stored in the road environment DB 170, time environment information, and unexpected situation information stored in unexpected situation information DB 180.

The meteorological information includes weather information, fine dust information, etc., the road environment information includes traffic situation information, traffic volume information, etc, the unexpected situation information includes traffic accident information, broken-down vehicle information, road control information, etc., and the time environment information includes time information, holiday information, etc.

More specifically, the 2D space-time image generation unit 120 generates the 2D space-time image by combining the weather information and unexpected situation information of the customized composite data for each piece of time environment information and corresponding space information (e.g., location information) with road environment information. Thereafter, the 2D space-time image generation unit 120 performs labeling based on the road environment information.

Furthermore, the 2D space-time image generation unit 120 generates the 2D space-time image of the control target intersection by analyzing a plurality of pieces of image data for the control target intersection in terms of time and space.

First, the 2D space-time image generation unit 120 analyzes image data for the control target intersection, represents the image data in the form of 2D space-time matrices, and generates the 2D image by using the 2D space-time matrices.

The 2D space-time image generation unit 120 generates a grid for a 2D space-time domain by dividing a space into a specific number of sections in the plurality of pieces of image data for the control target intersection, and then calculates average travel speeds for the respective sections.

Thereafter, the 2D space-time image generation unit 120 determines a corresponding section to be any one of a plurality of channels based on its average travel speed, and inputs a numerical value corresponding to the determined channel into the grid.

For example, the 2D space-time image generation unit 120 classifies a corresponding section as any one of a red (R) channel, a green (G) channel, and a blue (B) channel based on its average travel speed. Each of the channels is represented by an 8-bit numerical value including 256 colors. In other words, the average travel speed may be represented by a numerical value including 3-channel RGB colors between 0 and 1 in a reverse manner.

The real-time traffic congestion index generation unit 130 generates a real-time traffic congestion index by using the 2D space-time image of the control target intersection and the 2D space-time image of the customized composite data generated by the 2D space-time image generation unit 120, and provides the real-time traffic congestion index to the traffic signal control unit 140.

The real-time traffic congestion index generation unit 130 may generate a real-time traffic congestion index to minimize the difference between an actual value and an estimated value based on the labeling of the 2D space-time image control target intersection and the 2D space-time image of the customized composite data, as shown in Equation 1 below:

$$MSE = \frac{1}{n}\sum_{i=1}^{n}(Y-X)^2 \quad (1)$$

MES: the difference between the actual value and the estimated value
X: the estimated value
Y: the actual value
n: the total number of pieces of data The traffic signal control unit 140 controls the traffic signals of the control target intersection based on the real-time traffic congestion index generated by the real-time traffic congestion index generation unit 130.

In an embodiment, the traffic signal control unit 140 sets a congestion index prediction information range by analyzing the pattern of real-time traffic congestion indices generated by the real-time traffic congestion index generation unit 130, and controls the traffic signals of the control target intersection based on the congestion index prediction information range.

For this purpose, the traffic signal control unit 140 sets a congestion index prediction information range by analyzing the change in real-time traffic congestion index generated by the real-time traffic congestion index generation unit 130 and a congestion pattern included in past history data.

In this case, information about traffic congestion indices is collected at short intervals ranging from 5 to 15 minutes or long intervals ranging from 30 minutes to 1 hour, and thus the optimum utilization range of the prediction information may be set through a tuning operation of applying various prediction information lengths to a control algorithm and evaluating the results of the application.

Thereafter, the traffic signal control unit 140 sets control algorithm input parameters including the traffic congestion index prediction information range, aggregated traffic density, and aggregated traffic flow, and controls the traffic signals of the control target intersection based on the set input parameters.

Figure 3:
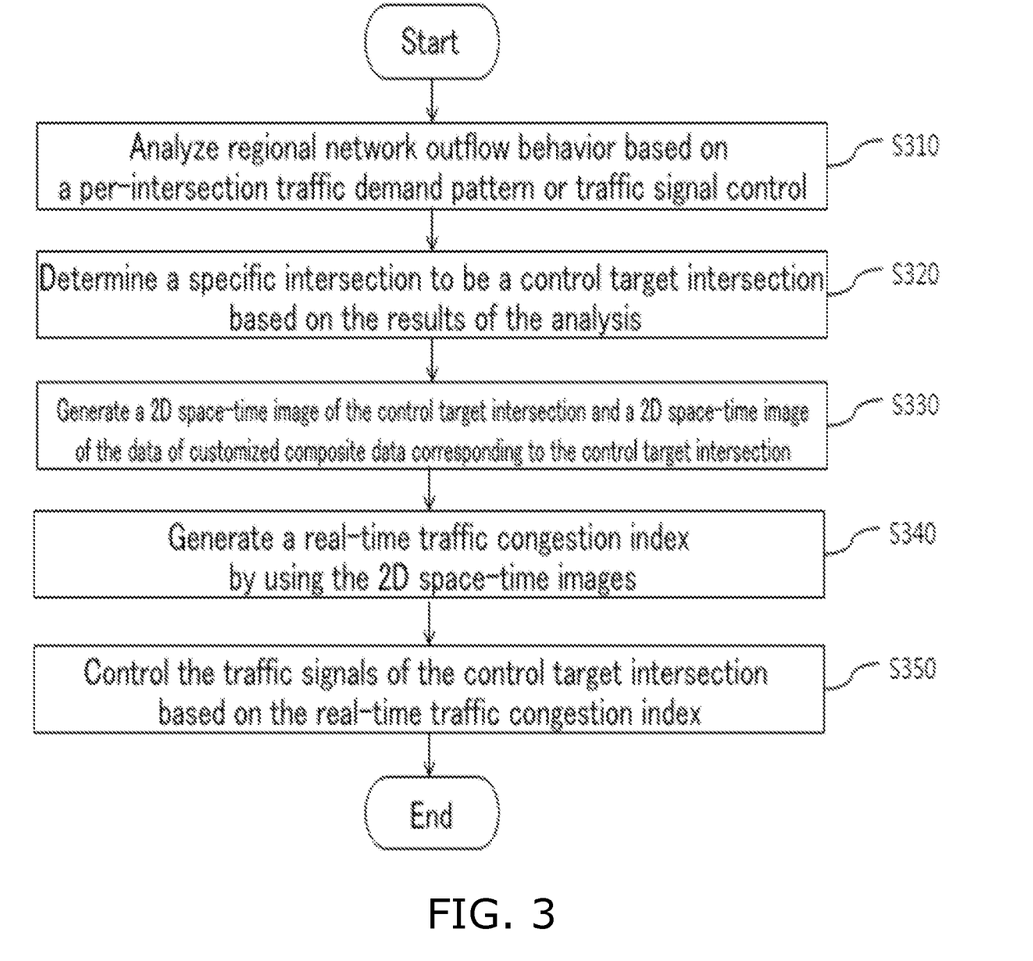
FIG. 3 is a flowchart illustrating a method of predicting traffic congestion and controlling traffic signals based on deep learning according to an embodiment of the present invention.

FIG. 3 is a flowchart illustrating a method of predicting traffic congestion and controlling traffic signals based on deep learning according to an embodiment of the present invention.

Referring to FIG. 3, the deep learning-based traffic congestion prediction and traffic signal control server 100 analyzes regional network outflow behavior based on a per-intersection traffic demand pattern or traffic signal control at step S310. The deep learning-based traffic congestion prediction and traffic signal control server 100 determines a specific intersection to be a control target intersection based on the results of the analysis at step S320.

The deep learning-based traffic congestion prediction and traffic signal control server 100 generates 2D space-time images by analyzing the data of predetermined customized composite data corresponding to the control target intersection and a plurality of pieces of image data for the control target intersection in terms of time and space at step S330.

The deep learning-based traffic congestion prediction and traffic signal control server 100 generates a real-time traffic congestion index by using the 2D space-time image of the control target intersection and the 2D space-time image of the data of the customized composite data corresponding to the control target intersection at step S340.

The deep learning-based traffic congestion prediction and traffic signal control server 100 controls the traffic signals of the control target intersection based on the real-time traffic congestion index at step S350.

According to an embodiment of the present invention, an advantage arises in that a traffic congestion cost problem can be solved by applying artificial intelligence traffic signal control technology at predicted congestion time in order to control the traffic signals of a congested intersection.

Furthermore, according to an embodiment of the present invention, an advantage arises in that per-intersection traffic information collected in real time can be monitored and urban traffic operation and management can be more objectively and systematically performed.

Furthermore, according to an embodiment of the present invention, an advantage arises in that urban congestion can be reduced by operating the traffic signals of an intersection in response to the demands that vary depending on an environment.

Moreover, according to an embodiment of the present invention, an advantage arises in that social benefits can be provided by reducing travelling expenses, logistical costs, etc. by means of reductions in traffic congestion, in that there can be performed the control of signal periods in which not only traffic information but also the real-time situation of a current intersection have been incorporated into newly constructed traffic infrastructure, and in that utility can be improved by being applied without incurring the cost required to change existing infrastructure or add excessive equipment to the infrastructure.

While the present invention has been described in conjunction with the specific embodiments, it will be apparent that various modifications may be made without departing from the scope of the invention. Therefore, the scope of the present invention should not be defined only based on the above-described embodiments, but should be defined based on not only the attached claims but also equivalents to the attached claims.

Although the present invention has been described in conjunction with the limited embodiments and drawings above, the present invention is not limited to the embodiments. It will be apparent to those having ordinary knowledge in the art to which the present invention pertains that various modifications and alterations may be made from the foregoing description. Accordingly, the spirit of the present invention should be defined only based on the attached claims, and equivalents to the attached claims should be also interpreted as falling within the scope and spirit of the present invention.

What is claimed is:

1. A method of predicting traffic congestion and controlling traffic signals based on deep learning, the method being performed in a deep learning-based traffic congestion prediction and traffic signal control server, the method comprising:
    analyzing regional network outflow behavior based on a per-intersection traffic demand pattern or traffic signal control, and determining a specific intersection to be a control target intersection based on results of the analysis;
    generating second-dimensional (2D) space-time images by analyzing data of predetermined customized composite data corresponding to the control target intersection and a plurality of pieces of image data for the control target intersection in terms of time and space;
    generating a real-time traffic congestion index by using the 2D space-time image of the control target intersection and the 2D space-time image of the data of the customized composite data corresponding to the control target intersection; and
    controlling traffic signals of the control target intersection based on the real-time traffic congestion index.

2. The method of claim 1, wherein analyzing the per-intersection traffic demand pattern or regional network outflow behavior based on traffic signal control, and determining the specific intersection to be the control target intersection based on the results of the analysis comprises:
    determining a change in regional traffic volume by analyzing a traffic demand (outbound demand) directed to areas outside a downtown road network area and a traffic demand (local demand) directed to an inside of the area, such as a residential area road and a parking space; and
    determining a specific intersection to be the control target intersection based on the change in regional traffic volume.

3. The method of claim 1, wherein generating the 2D space-time images by analyzing the data of the predetermined customized composite data corresponding to the control target intersection and the plurality of pieces of image data for the control target intersection in terms of time and space comprises:
    generating a grid for a 2D space-time domain by dividing a space into a specific number of sections in the 2D space-time image of the control target intersection, and then calculating average travel speeds for the respective sections; and
    determining a corresponding section to be any one of a plurality of channels based on its average travel speed, and inputting a numerical value corresponding to the determined channel into the grid.

4. The method of claim 1, wherein generating the 2D space-time images by analyzing the data of the predetermined customized composite data corresponding to the control target intersection and the plurality of pieces of image data for the control target intersection in terms of time and space comprises:
    generating the 2D space-time images by combining weather information and unexpected situation information of the customized composite data for each piece of time environment information and corresponding space information with road environment information; and
    labeling the 2D space-time images based on the road environment information.

5. A deep learning-based traffic congestion prediction and traffic signal control server, comprising:
    a control target intersection determination unit configured to analyze regional network outflow behavior based on a per-intersection traffic demand pattern or traffic signal control, and to determine a specific intersection to be a control target intersection based on results of the analysis;
    a 2D space-time image generation unit configured to generate 2D space-time images by analyzing data of predetermined customized composite data corresponding to the control target intersection and a plurality of pieces of image data for the control target intersection in terms of time and space;
    a real-time traffic congestion index generation unit configured to generate a real-time traffic congestion index by using the 2D space-time image of the control target intersection and the 2D space-time image of the data of the customized composite data corresponding to the control target intersection; and
    a traffic signal control unit configured to control traffic signals of the control target intersection based on the real-time traffic congestion index.

6. The deep learning-based traffic congestion prediction and traffic signal control server of claim 5, wherein the control target intersection determination unit is further configured to:

determine a change in regional traffic volume by analyzing a traffic demand (outbound demand) directed to areas outside a downtown road network area and a traffic demand (local demand) directed to an inside of the area, such as a residential area road and a parking space; and determine a specific intersection to be the control target intersection based on the change in regional traffic volume.

7. The deep learning-based traffic congestion prediction and traffic signal control server of claim 5, wherein the 2D space-time image generation unit is further configured to:

generate a grid for a 2D space-time domain by dividing a space into a specific number of sections in the 2D space-time image of the control target intersection, and then calculate average travel speeds for the respective sections; and determine a corresponding section to be any one of a plurality of channels based on its average travel speed, and input a numerical value corresponding to the determined channel into the grid.

8. The deep learning-based traffic congestion prediction and traffic signal control server of claim 5, wherein the 2D space-time image generation unit is further configured to:

generate the 2D space-time images by combining weather information and unexpected situation information of the customized composite data for each piece of time environment information and corresponding space information with road environment information; and label the 2D space-time images based on the road environment information.

* * * * *